United States Patent

Nothofer et al.

Patent Number: 5,878,180
Date of Patent: Mar. 2, 1999

[54] OPTICAL FIBER CABLE WITH STACKS OF OPTICAL FIBER RIBBONS

[75] Inventors: Klaus Nothofer, Erkrath; Helmut Haag, Titz, both of Germany

[73] Assignee: Alcatel, France

[21] Appl. No.: 936,332

[22] Filed: Sep. 24, 1997

[30] Foreign Application Priority Data

Oct. 4, 1996 [DE] Germany ............... 196 40 935.7

[51] Int. Cl.$^6$ .................................................. G02B 6/44
[52] U.S. Cl. .................................................. 385/114
[58] Field of Search ............... 385/112–114, 104; 156/344, 584; 57/9, 11, 264, 352

[56] References Cited

U.S. PATENT DOCUMENTS

| | | | |
|---|---|---|---|
| 5,067,830 | 11/1991 | McAlpine et al. | 385/114 |
| 5,249,249 | 9/1993 | Eoll et al. | |
| 5,331,796 | 7/1994 | Varga | 57/9 |
| 5,487,261 | 1/1996 | Varga | 57/9 |
| 5,561,730 | 10/1996 | Lochkovic et al. | 385/114 |
| 5,621,841 | 4/1997 | Field | 385/113 |
| 5,643,393 | 7/1997 | Genovese et al. | 156/344 |
| 5,651,082 | 7/1997 | Eoll | 385/114 |

FOREIGN PATENT DOCUMENTS 40 40 715 A1 6/1992 Germany.
42 11 488 A1 10/1993 Germany.

*Primary Examiner*—Akm E. Ullah
*Attorney, Agent, or Firm*—Ware, Fressola, Van der Sluys & Adolphson LLP

[57] ABSTRACT

An optical fiber cable (1) or an optical fiber element has a number of superimposed and adjacent stacks of optical fiber ribbons (3) containing optical fiber ribbons (11), as well as an outer jacket (7). The stacks of optical fiber ribbons (3) are arranged over and/or adjacent to each other and in parallel. Such a construction of an optical fiber cable or an optical fiber element makes a particularly high packing density of the optical fibers possible, so that the optical fiber cable or the optical fiber element can have small outside dimensions even when it contains a large number of optical fibers.

12 Claims, 4 Drawing Sheets

OPTICAL FIBER CABLE WITH STACKS OF OPTICAL FIBER RIBBONS

BACKGROUND OF THE INVENTION

1. Technical Field

The invention concerns an optical fiber cable or an optical fiber element with several superimposed and joined stacks of optical fiber ribbons and an outer jacket.

2. Description of the Prior Art

Optical fiber ribbons comprise a large number of optical fibers which run flat and parallel to each other in one plane and are enclosed between two adhesive films or are bonded together with a material that can be hardened with UV light. Such optical fiber ribbons are used worldwide and to an increasing degree in the manufacture of optical fiber cables or optical fiber elements. As compared to known hollow or bundled conductors with individual optical fibers placed loosely therein, optical fiber ribbons have a significantly higher packing density and the defined position of the individual optical fibers with respect to each other enables the use of simpler joining techniques such as the mass splicing technique.

To arrange optical fiber ribbons in optical fiber cables or optical fiber elements, it is known to superimpose and join several optical fiber ribbons in a stack and enclose it in a tube-shaped protective jacket. Such an optical fiber element can be used as a central conductor or a number of such optical fiber elements can be twisted around a central strength element. It is also known to arrange stacks of optical fiber ribbons in the grooves of a core running lengthwise in a straight or a helical manner.

All of these known constructions of optical fiber cables or elements have in common that by arranging the square stacks of optical fiber ribbons inside the cable or element, there are large unused cross sections which unnecessarily increase the outside diameter and the weight of the optical fiber cable or element.

SUMMARY OF THE INVENTION

Starting from this state of the art, it is an object of the invention to form an optical fiber cable or optical fiber element in a way so that it still keeps its very compact outside dimensions while containing a large number of optical fibers.

This object is achieved by the invention in that it stacks optical fiber ribbons over and/or adjacent to each other but still arranges them parallel to each other.

The special advantages that can be obtained with the invention are that the arrangement of the stacks of optical fiber ribbons over and/or adjacent to each other in the form of a square matrix makes it possible to achieve a particularly high packing density of the optical fibers in the optical fiber element, and to minimize unused cross sections in the optical fiber cable or in the optical fiber element. An optical fiber cable of the invention or an optical fiber element of the invention therefore has notably small outside dimensions even when it contains a large number of optical fibers and can be produced in a simple and cost-effective manner. Beyond that, the matrix-type arrangement of the stacks of optical fiber ribbons makes it very simple to identify the individual optical fibers and to keep their installation time very short, particularly when using the known mass splicing technique with special optical fiber ribbon plugs. In addition, the couplings can have very small outside dimensions.

The optical fiber cable of the invention can be used as a main or a local junction cable. Because of its very small outside dimensions, the optical fiber element of the invention is particularly suitable for so-called hybrid cables in which electrical conductors are provided to transmit messages in addition to the optical fibers.

It is particularly advantageous when the stacks of optical fiber ribbons are commonly twisted within the outer jacket. Twisting the matrix of individual stacks of optical fiber ribbons allows to significantly improve the flexibility of the optical fiber cable or the optical fiber element and to clearly reduce the expansion and compression of the optical fibers which can lead to increased optical attenuations.

It is advantageous if the stacks of optical fiber ribbons can move in relation to each other. If the optical fiber cable or the optical fiber element is bent, the individual stacks of optical fiber ribbons are able to slide and shift with respect to each other. This prevents unacceptable expansion or compression stresses in the optical fibers when the optical fiber cable or optical fiber element is bent.

The invention will be fully understood when reference is made to the following detailed description taken in conjunction with the accompanying drawings.

DETAILED DESCRIPTION OF THE INVENTION

Figure 1:
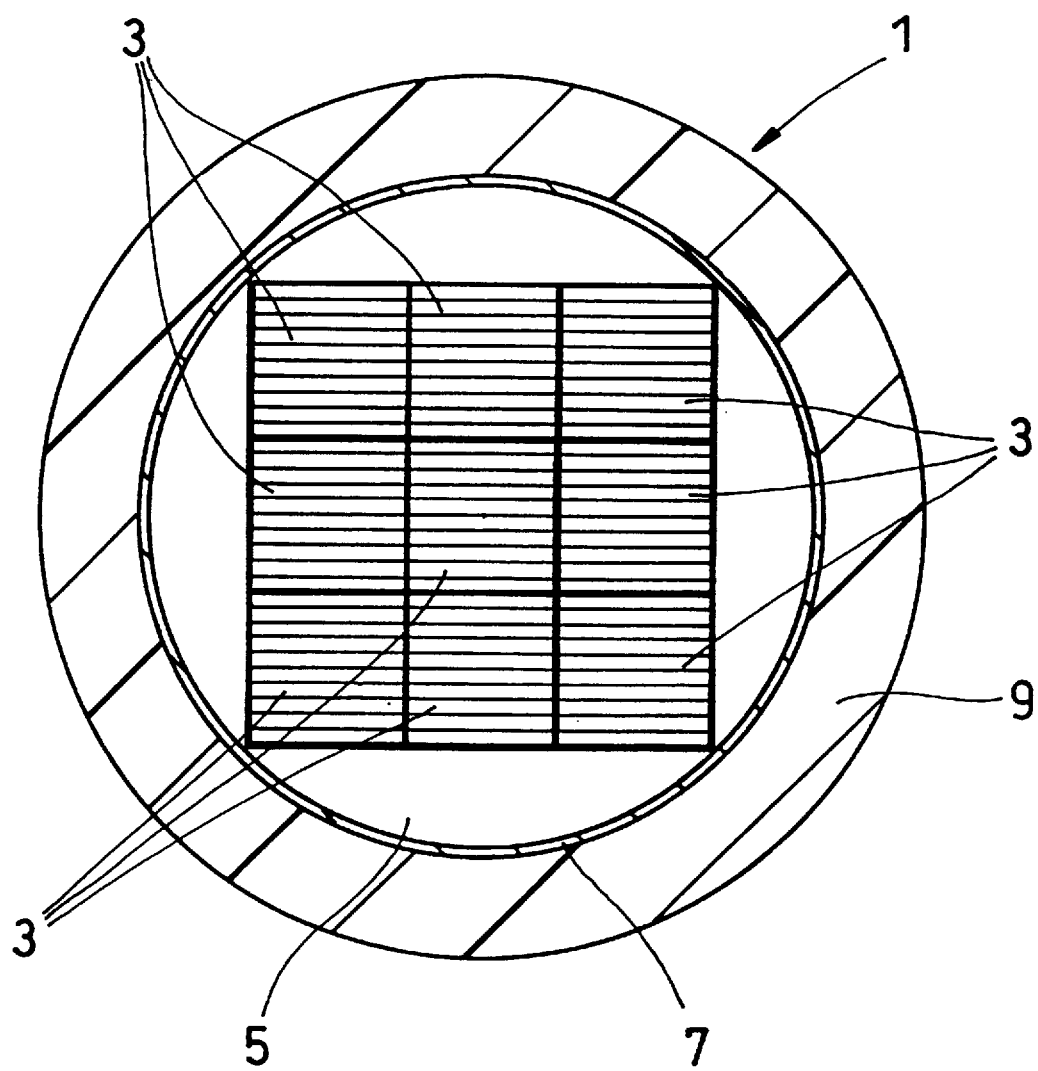
FIG. 1 is a cross-sectional view of a first embodiment of an optical fiber cable according to the invention.

The optical fiber cable 1 illustrated in FIG. 1 comprises nine parallel stacks of optical fiber ribbons 3, three of which are superimposed and three are arranged adjacent to each other in the form of a square matrix. In this case, the stacks of optical fiber ribbons 3 touch directly and can be shifted with respect to each other. However, it is also possible to arrange thin films between the individual stacks of optical fiber ribbons 3 which cushion them against each other and improve their ability to shift in relation to each other. The stacks of optical fiber ribbons 3 in this embodiment are commonly twisted in long lays. To protect the optical fibers, they are embedded in a filler material 5 and enclosed by an outer jacket 7. A casing 9 of a suitable plastic material is placed over the outer jacket 7.

It is of course also possible for the optical fiber cable 1 to contain additional layers and to arrange additional reinforcing elements in or under the casing 9 to protect the optical fibers against unacceptable mechanical stresses.

Figure 2:
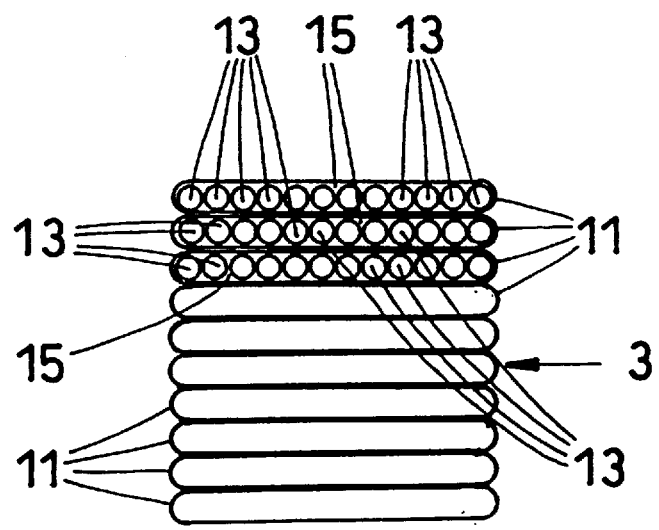
FIG. 2 is a cross-sectional view of a stack of optical fiber ribbons.

FIG. 2 for example illustrates a stack of optical fiber ribbons 3 from the first embodiment in FIG. 1. The stack 3 contains ten superimposed and adjacent optical fiber ribbons 11, but for the sake of simplicity only three of them are illustrated in detail. Each of these optical fiber ribbons 11 has twelve optical fibers 13 running parallel and at equal distances from each other, which are enclosed by a ribbon matrix 15. The matrix 15 of each optical fiber ribbon 11 is produced by jointly coating the twelve optical fiber ribbons 13 with a UV-hardenable material and subsequently hardening this material with a source of UV radiation. To simplify the manufacture of the optical fiber cable 1, the optical fiber ribbons 11 in each stack of optical fiber ribbons 3 may be connected to each other.

Figure 3:
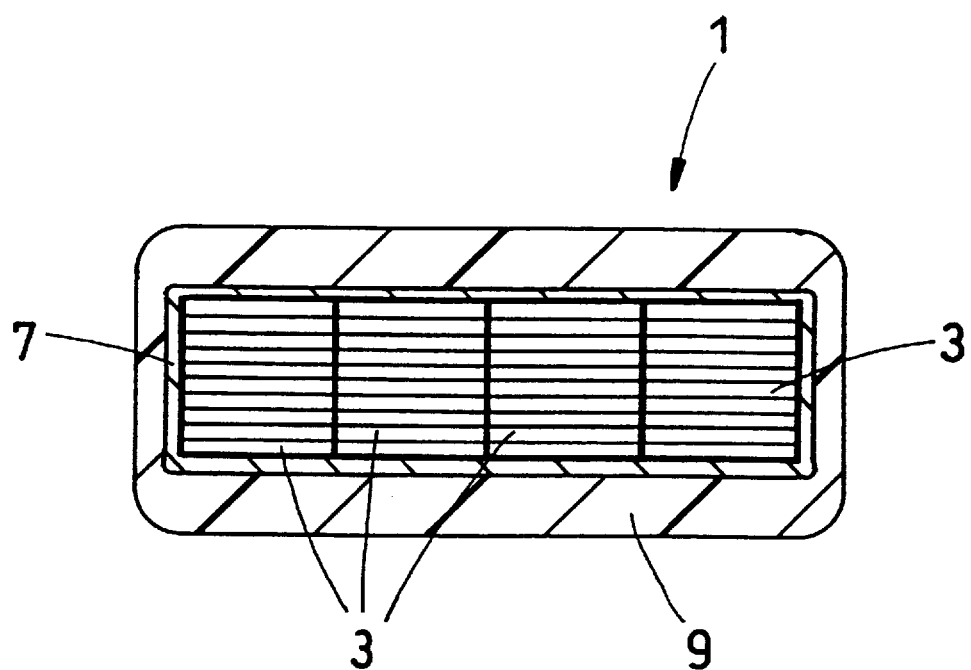
FIG. 3 is a cross-sectional view of a second embodiment of an optical fiber cable.

The second embodiment of an optical fiber cable 1 of the invention illustrated in FIG. 3 has four stacks of optical fiber ribbons 3 arranged parallel and adjacent in one plane. Each stack 3 has the same construction as the stack of optical fiber ribbons 3 illustrated in FIG. 2. The stacks of optical fiber ribbons 3 are jointly enclosed by an outer jacket 7 with a casing 9 placed over it. Like the first embodiment of the invention, the optical fiber cable 1 in the second embodiment of the invention can also have additional elements and/or layers.

Figure 4:
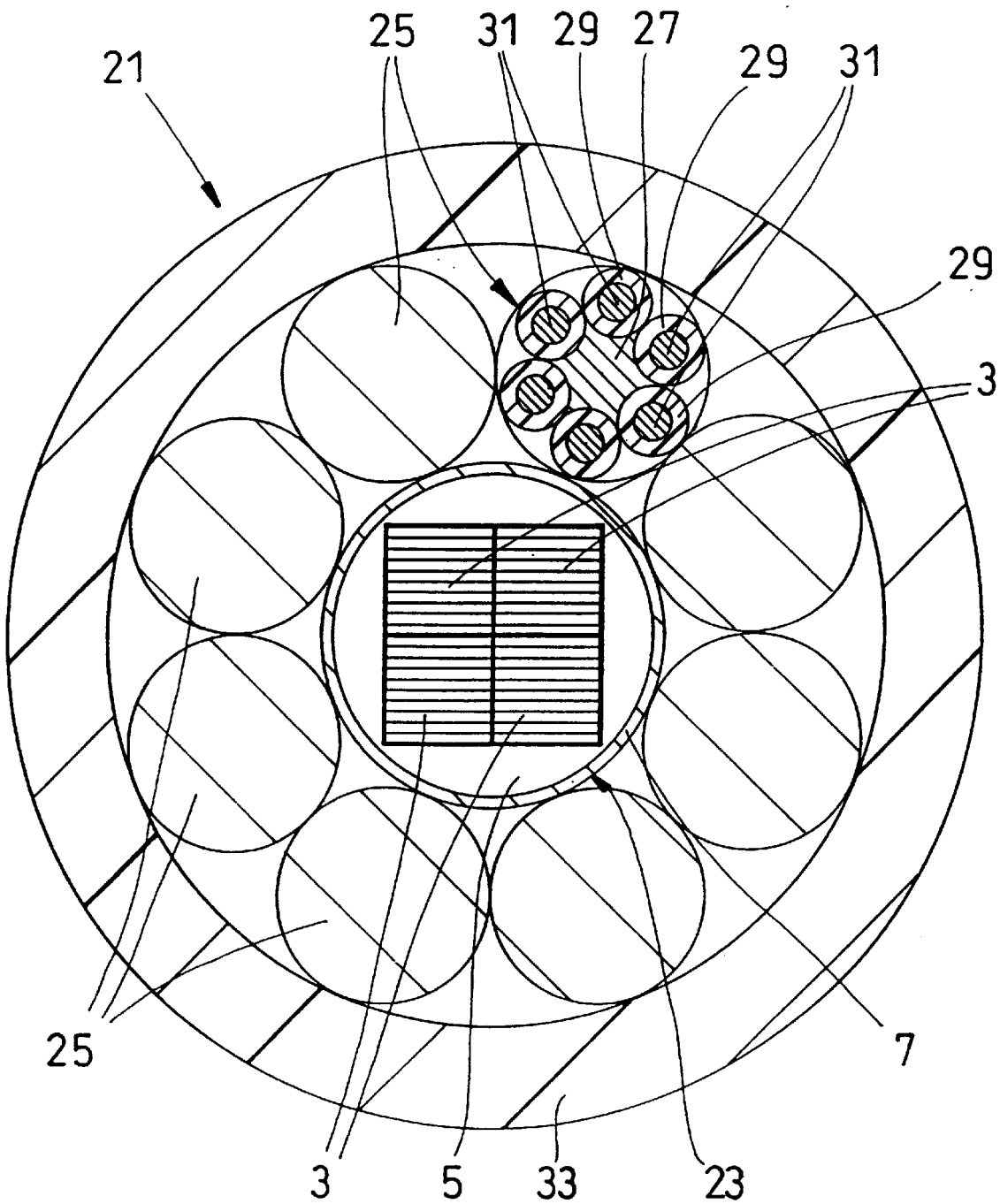
FIG. 4 is a cross-sectional view of a third embodiment of an optical fiber element arranged in a hybrid cable.

The hybrid cable 21 illustrated in FIG. 4 comprises a central optical fiber element 23 of the invention with four stacks of optical fiber ribbons 3. The stacks of optical fiber ribbons 3 correspond to the stack of optical fiber ribbons illustrated in FIG. 2 where each has ten superimposed optical fiber ribbons. Two stacks of optical fiber ribbons 3 are placed over each other and two are next to and parallel to each other in the form of a square matrix in which the stacks of optical fiber ribbons 3 are directly adjacent to each other. The stacks of optical fiber ribbons 3 are commonly twisted in long lays. They are embedded in a filler material 5 and enclosed by an outer jacket 7. Eight electrical conductor elements 25 are twisted around the thus formed central optical fiber element 23. Each of these electrical conductor elements 25, of which FIG. 4 illustrates only one in detail, has six electrical conductors 31 equipped with an electrical insulation 29, which are twisted around a central core 27. The illustrated embodiment provides a casing 33 thereover. Additional layers could be provided under the casing 33 and reinforcing elements inside the casing 33.

The embodiments described above admirably achieve the objects of the invention. However, it will be appreciated that departures can be made by those skilled in the art without departing from the spirit and scope of the invention which is limited only by the following claims.

What is claimed is:

1. Optical fiber element comprising:
   (a) a plurality of stacks of optical fiber ribbons, each optical fiber ribbon having a plurality of optical fibers bonded together in a matrix material, the plurality of stacks of optical fiber ribbons arranged in a manner chosen from a group consisting of:
      (i) superimposed on each other and adjacent and parallel to each other to form a generally rectangular matrix,
      (ii) adjacent and parallel to each other to form a generally flat matrix, and
      (iii) superimposed on each other and parallel to each other; and
   (b) an outer jacket surrounding the plurality of stacks of optical fiber ribbons.

2. Optical fiber element as claimed in claim 1, wherein the stacks of optical fiber ribbons are commonly twisted inside the outer jacket when the plurality of stacks of optical fiber ribbons are superimposed on each other and adjacent and parallel to each other to form a generally rectangular matrix.

3. Optical fiber element as claimed in claim 2, wherein the stacks of optical fiber ribbons can be shifted in relation to each other.

4. Optical fiber element as claimed in claim 1, wherein the stacks of optical fiber ribbons can be shifted in relation to each other.

5. Optical fiber element as claimed in claim 1, wherein the generally rectangular matrix is a substantially square matrix.

6. Optical fiber element as claimed in claim 1, wherein the plurality of optical fibers in each ribbon extend parallel to one another.

7. Optical fiber cable comprising:
   (a) optical fiber element comprising:
      (i) a plurality of stacks of optical fiber ribbons, each optical fiber ribbon having a plurality of optical fibers bonded together in a matrix material, the plurality of stacks of optical fiber ribbons arranged in a manner chosen from a group consisting of:
         superimposed on each other and adjacent and parallel to each other to form a generally rectangular matrix,
         adjacent and parallel to each other to form a generally flat matrix, and
         superimposed on each other and parallel to each other, and
      (ii) a jacket surrounding the plurality of stacks of optical fiber ribbons; and
   (b) a casing surrounding the jacket.

8. Optical fiber cable as claimed in claim 7, wherein the stacks of optical fiber ribbons are commonly twisted inside the outer jacket when the plurality of stacks of optical fiber ribbons are superimposed on each other and adjacent and parallel to each other to form a generally rectangular matrix.

9. Optical fiber cable as claimed in claim 8, wherein the stacks of optical fiber ribbons can be shifted in relation to each other.

10. Optical fiber cable as claimed in claim 7, wherein the stacks of optical fiber ribbons can be shifted in relation to each other.

11. Optical fiber cable as claimed in claim 7, wherein the generally rectangular matrix is a substantially square matrix.

12. Optical fiber cable as claimed in claim 7, wherein the plurality of optical fibers in each ribbon extend parallel to one another.

* * * * *